United States Patent [19]

Trancik

[11] 3,896,789

[45] July 29, 1975

[54] RETINOIC ACID DIPENSING PRESSURE SENSITIVE DERMOTOLOGICAL TAPE

[75] Inventor: Ronald J. Trancik, White Bear Lake, Minn.

[73] Assignee: Riker Laboratories, Inc., Northridge, Calif.

[22] Filed: June 10, 1974

[21] Appl. No.: 477,689

[52] U.S. Cl. ............... 128/2 R; 424/28; 128/156; 128/268; 117/122 PA; 117/122 P
[51] Int. Cl. ........................... C09j 7/02; A61f 7/02
[58] Field of Search .......... 128/2 R, 2 W, 260, 268, 128/156, 287; 424/28, 33; 117/122 P, 122 PA, 122 PF

[56] References Cited
UNITED STATES PATENTS

| | | | |
|---|---|---|---|
| 3,297,034 | 1/1967 | Peavy | 128/390 |
| 3,632,740 | 1/1972 | Robinson | 424/28 |
| 3,635,755 | 1/1972 | Balinth | 117/122 P |
| 3,742,951 | 7/1973 | Zaffaroni | 128/268 |
| 3,769,071 | 10/1973 | Trancik | 117/122 P |
| 3,777,754 | 12/1973 | Plachy | 128/268 |
| 3,788,296 | 1/1974 | Kelkheim | 128/268 |
| 3,797,495 | 3/1974 | Schmidt | 128/287 |
| 3,814,095 | 6/1974 | Lubens | 128/260 |

*Primary Examiner*—Aldrich F. Medbery
*Attorney, Agent, or Firm*—Alexander, Sell, Steldt & DeLaHunt

[57] ABSTRACT

A pressure-sensitive adhesive tape comprising a backing with a layer of pressure-sensitive adhesive attached thereto, said pressure-sensitive adhesive layer comprising pressure-sensitive adhesive, a pharmaceutically effective concentration of retinoic acid, and retinoic acid stabilizer. The tape is useful for topical treatment of skin diseases.

8 Claims, No Drawings

RETINOIC ACID DIPENSING PRESSURE SENSITIVE DERMOTOLOGICAL TAPE

This invention relates to pressure-sensitive adhesive tapes containing retinoic acid in the adhesive portion of the tape.

Retinoic acid or vitamin A acid is 3,7-dimethyl-9-(2,6,6-trimethyl-1-cyclohexen-1-yl)-2,4,6,8-nonatetraeneoic acid. Its structure is shown below:

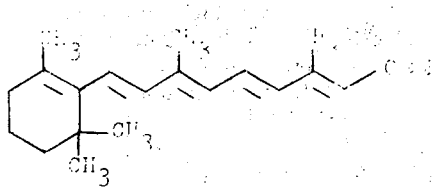

Retinoic acid is commercially available and its preparation is described in U.S. Pat. No. 3,006,939, issued Oct. 31, 1961. Retinoic acid has been reported to have good keratolytic action and to be effective against cutaneous diseases such as psoriasis, acne, skin tumors, warts, and ichthyosis.

Dermatologic therapy utilizing retinoic acid is currently performed using solutions (for example retinoic acid in propylene glycol-ethanol), ointments or creams. These formulations have been effective against skin diseases but have several disadvantages including:

A. it is difficult to treat a specific area of the skin with them because the carrier material tends to allow unnecessary treatment to be provided to normal skin resulting in inflamation of the normal skin;

B. the nature of the formulation renders it difficult to apply evenly resulting in uneven dosage;

C. if the formulations are exposed to light, phototoxicity is a potential hazard due to the interaction between the untraviolet component of light with the drug and skin;

D. cream, ointment and liquid formulations are impractical or uncomfortable under or near clothing and such formulations can be readily transferred by rubbing, scratching, etc.;

E. such formulations may be cosmetically undesirable; and

F. retinoic acid is unstable; thus, it has a short shelf life and is polymerized in the presence of water.

Covering dressings have been used in conjunction with the above-noted formulations in order to overcome some of the problems noted. Dressings have also been used in order to allow for reduced dosage (0.1 to 2.0 percent by weight) included drug because of the improved percutaneous absorption of the drug. Dressings have the disadvantage of being cumbersome, inconvenient and cosmetically undesirable.

Inclusion of drugs in the adhesive portion of a pressure-sensitive adhesive tape is known; U.S. Pat. No. 3,632,740 and 3,769,071. Such drugs have not had a chemical structure similar to that of retinoic acid, i.e., an acidic compound with multiple double bonds. Typically the drugs or medicaments included in the prior art tapes, e.g., steroids and salicylates, have solubilizing substituents or side-chains and are compatible with a wide range of materials. 5-Fluorouracil is an exception. Retinoic acid, due to its olefinic nature and tendency to polymerize and/or degrade readily, is known to have limited stability when exposed to ambient, that is, normal room-type conditions. Also, it is known to be unstable to the ultraviolet component of light and in an aqueous environment. Thus it has not been previously incorpoated in the adhesive portion of a pressure-sensitive adhesive tape.

A pressure-sensitive adhesive tape containing retinoic acid has been found which is stable. It is a pressure-sensitive adhesive tape comprising a backing with a layer of pressure-sensitive adhesive attached thereto, said pressure-sensitive adhesive layer comprising pressuresensitive adhesive, a pharmaceutically effective concentration of retinoic acid, and retinoic acid stabilizer. Such a tape does not have the problems discussed above.

The retinoic acid is preferably homogeneously and substantially uniformly distributed throughout the pressure-sensitive adhesive portion of the tape. By "homogeneously" it is meant that the retinoic acid is distributed throughout the pressure-sensitive adhesive substantially in the manner that a solute is distributed in a solution.

The backing of the pressure-sensitive adhesive tape is any of the normal backing materials for pressuresensitive adhesive tapes such as polyethylene, randomly oriented nylon fibers, polypropylene, ethylene-vinyl acetate copolymer, polyurethane, etc. The backing can be optionally microporous or macroporous such as those described in U.S. Pat. No. 3,121,021 and U.S. Pat. No. 3,214,501. The backing of the tape prevents photodegradation of the retinoic acid in the pressure-sensitive adhesive and prevents phototoxicity by the exclusion of ultraviolet light.

The pressure-sensitive adhesives utilized are any of those which are compatable with retinoic acid, that is, will form a homogeneous solution with retinoic acid and are compatible with human skin. It is preferred that the pressuresensitive adhesive be self-tackified and sufficiently heat-and light-stable to avoid the need for tackifier and stabilizer additives for the pressure-sensitive adhesive. As will be discussed later, a stabilizer or stabilizers for the retinoic acid are included. The pressure-sensitive adhesive is an inherently rubbery and tacky polymer which is tacky and biologically compatible to the skin. The preferred pressure-sensitive adhesives are the acrylate- and polyurethane-types which form films which have a 100 percent modulus of less than 7 kg/cm$^2$, preferably less than 5 kg/cm$^2$.

The inherently and normally tacky polyurethanetype polymer which can be used and are preferred as the pressure-sensitive adhesive in tapes of this invention are solid polyurethane, polyurethane-polyurea, or polyureapolymers containing at least 20 percent by weight pendant chains (U.S. Pat. No. 3,796,678). These polymers are derived from prepolymers having a high functionality (at least 2.8) capped with at least 0.5 equivalent of a monofunctional capping agent, a high weight percent of oxyalkylene units, a low weight percent of aromatic nuclei, and little or no crosslinking, preferably less than one cross-link per 8,000 theoretical atomic mass units of polymer. The prepolymers are chain extended with water, diols or the like (preferably water) to provide a film-forming, normally and inherently tacky polymer with a 100 percent modulus of, preferably, less than about 5 kg/cm$^2$. The chain-extended polymers preferably contain hydrophilic groups in the polymer chain, e.g., protonated teritary nitrogens and are thus self-emulsifying. The polymers are preferably provided for use in this invention as aqueous lattices or dispersions in organic liquid carriers such as acetone. The aforementioned pendent chains have about 600 to about 4000 atomic mass units.

The polyurethane-type polymers which are most preferred for use in this invention are prepared from prepolymers which in turn are initially prepared from (1) a poly(oxyalkylene) triol or mixtures of this triol with a tetrol, and (2) an aromatic or aralkylene diisocyanate such as tolylene diisocyanate, xylylene diisocyanate, naphthylene diisocyanate, 4,4'-diphenylmethane diisocyanate, or the like, in an NCO/OH ratio of about 1.8 to 2.0:1. The prefered triols are the poly(oxypropylene) triols having a hydroxide equivalent weight ranging from about 500 to about 2,000; the preferred tetrols have the formula $$[H(OC_2H_4)_m(OC_2H_4)_n]_2-N-C_2H_4-N[(C_3H_6O)_n(C_2H_4O)_nH]_2$$

where $n:m$ normally ranges from 5:95 to 95:5, but preferably is about 9:1, and $n + m$ is a number large enough to provide a hydroxide equivalent weight in the range of about 500 to about 2,000. The preferred diisocyanate is tolylene diisocyanate, preferably the 2,4- and/or 2,6-isomer. After the initial prepolymer has been prepared, it is end-capped with a capping agent preferably diluted with dry toluene. Suitable capping agents include the primary and secondary lower alkanols (n-butyl alcohol, i-propyl alcohol, n-butyl alcohol, etc.) and/or a compound of the formula:

(lower alkyl)$_{alkyl2}$N - (lower alkylene) OH such as diethylethanolamine, diisopropylethanolamine, or the like. The capping reaction provides at least 20 weight percent pendent chains as described previously, and reduces the isocyanate functionality of the prepolymer from about 3 to 4 down to about 2. The partially end-capped prepolymer, as a solventless, viscous liquid or slightly diluted with a solvent, is added to a dilute aqueous solution of acetic acid and stirred with a conventional high speed, high shear mixer to simultaneously chain-extend and emulsify the prepolymer. After chain extension is complete and entrapped carbon dioxide has escaped, a stable latex with a bluish cast is obtained. The latex is thickened, if necessary to make it suitable for coating onto a tape backing or release liner as described hereinafter with conventional tape coating apparatus. Prior to coating, the retinoic acid can be added to the latex as described below, preferably dissolved or dispersed in a liquid carrier. The ultimate result is a two-component coating i.e., a homogeneous (solution-type) distribution of the drug in the polyurethane solids of the pressure-sensitive adhesive layer.

As noted, the preferred form of distribution of the retinoic acid in the pressure-sensitive adhesive is homogeneous. The above-described polyurethane adhesives which are the preferred adhesives readily form homogeneous distributions with retinoic acid.

Other suitable adhesives are copolymers of a major amount of an acrylate ester and a minor amount of acrylic acid. Suitable acrylate esters include isoamyl acrylate, the acrylate ester of commercial fusel oil, 2-ethylbutyl acrylate, ethyl acrylate, isooctyl acrylate and the like as set forth in U.S. Pat. No. Re. 24,906 (Ulrich), issured Dec., 1960, cf. Stow, U.S. Pat. No. 2,925,174, issued February, 1960. As also taught in that patent, acrylic acid, methacrylic acid, itaconic acid, acrylamide and methacrylamide can also be used as comonomers with the acrylate ester. The ratio of acrylic ester to acrylic acid, or its equivalent, can be in the range of 92–96:8–4.

The retinoic acid is present in the pressure-sensitive adhesive tape in a pharmaceutically effective concentration. Generally, this concentration will be from 0.001 to 5 percent by weight of the total weight of the pressure-sensitive adhesive layer of the tape, preferably 0.025 to 0.5 percent by weight.

Crystallization of retinoic acid in the adhesive has been found only at relatively high concentrations in the preferred adhesives. It is preferred not to have crystals present, that is, it is preferred to have the retinoic acid present in the pressure-sensitive adhesive in a homogeneous distribution.

The tapes of this invention are stable at normal ambient conditions for extended periods of time. The preferred embodiments of this invention are stable at temperatures up to 60°C.

Stability is enhanced by using various stabilizers which have been found to be useful for retinoic acid, such as propyl gallate, ethylene-diamine tetraacetic acid, butylated hydroxyanisole, butylated hydroxytoluene, ascorbic acid, citric acid, ethanolamine, vitamin E, dihydroxy-benzophenone and mixtures thereof. The preferred stabilizers include vitamin E, citric acd, butylated hydroxyanisole, butylated hydroxytoluene and mixtures thereof. Normally the stabilizers are present in the pressure-sensitive adhesive layer of the tape in concentrations from $1 \times 10^{-7}$ to 5 percent by weight of the pressure-sensitive adhesive tape, preferably $1 \times 10^{-5}$ to 0.5 percent by weight. The amount utilized depends on the amount of retinoic acid present and on the stabilizer used. A preferred stabilizer system is one which includes a combination of citric acid and vitamin E at preferably a ratio of citric acid to vitamin E of $1:1 \times 10^{-2}$ to $1:1 \times 10^{-4}$ by weight.

The tapes of the present invention are generally prepared by mixing the pressure-sensitive adhesive with a solvent. Generally the solvent is present up to about 50 percent by weight of the total of the adhesive/retinoic acid/stabilizer/solvent mixture, preferably less than about 30 percent by weight. The viscosity of the mixture is the limiting factor because the pressure-sensitive adhesive mixture must be coatable.

Retinoic acid is not readily soluble in most solvents. Thus, selection of an appropriate solvent is difficult. Furthermore, the solvent must be compatible with the pressure-sensitive adhesive, the stabilizers, the liner, if used, and backsize of the backing, if used, and with the backing. Preferred solvents for use in preparing the coating mixture for the tape of the present invention include for example ethanol, acetone, ethyl acetate, dimethyl sulfoxide, propylene glycol, acetic acid, N,N-dimethyl formamide and the like, or mixtures of such solvents. A combination of N,N-dimethyl formamide/acetic acid is preferred. Acetic acid is preferably part of the solvent system when polyurethane adhesives are used.

The retinoic acid can be distributed in the pressure-sensitive adhesive by various techniques including mixing the retinoic acid with the solvent and then mixing the solution with a mixture of stabilizers and the pressure-sensitive adhesive. Alternatively, the retinoic acid can be added as a dry solid to the pressure-sensitive adhesive and stabilizer when the pressure-sensitive adhesive is dissolved or disbursed in a solvent or liquid carrier which will dissolve the retinoic acid. Another method is to dissolve the retinoic acid in the pressure-sensitive adhesive after the latter has been heated to reasonable liquidity. Another method is to disburse the retinoic acid in a liquid carrier and add the dispersion to a solution or dispersion of pressure-sensitive adhesive in a liquid carrier which is a better solvent for the retinoic acid than the carrier into which the retinoic acid was originally disbursed.

The mixture of the pressure-sensitive adhesive/retinoic acid/stabilizer/solvent, if any and other ingredients, if any is coated on a suitable tape backing or release liner which is then applied to the backing. The solvent is evaporated leaving a layer comprising a pressure-sensitive adhesive containing the retinoic acid, and other components, if any. It is preferred that the pressure-sensitive adhesive be free of solvents when the tape of this invention is utilized in treating skin disorders.

As noted above, the tape of this invention can be used to treat many skin diseases. The tape allows specific convenient treatment with retinoic acid and provides a means to avoid phototoxicity. Furthermore, the tape provides a stable system for retinoic acid; thus, it has a prolonged shelf life.

The "100% modulus" referred to herein is most conveniently determined using a constant rate of extension tensile tester at 25°C. and an extension rate of 50.8 cm/min. (20in./mn.). Constant rate tensile testers are described in The Science and Technology of Polymer Films, Vol. I, O. J. Sweeting, ed., Interscience, Pub., New York, 1968, pp. 553–554, and a particularly suitable type is known by the trade designation "Instron."

The following examples are meant to illustrate but not to limit the invention. Parts and percentages are by weight unless otherwise specified. In the examples, stability of the tapes was tested by extracting the retinoic acid from the tapes at various time intervals as is noted in each example. The procedure for extraction and determining the amount of retinoic acid in the tapes is as follows:

A standard solution of retinoic acid in ethyl acetate was prepared with concentration of $30 \mu g/ml$. Tapes were cut to 5.3 cm$^2$ with a punch (2.3 cm/side). Analylsis was performed on triplicate retinoic acid and blank samples. Each sample was placed in an 8 dram vial after the liner had been removed and adhesive covered with a minimum amount of glass wool. 10 ml of solvent were added to each vial which were then placed on a platform shaker for an extraction period of 20–30 minutes. The extracts were then read directly on the spectrometer. A series of standard solutions were run with the tape extracts. A calibration curve of optical density vs $\mu g/ml$ was prepared and used to determine the concentration of samples from their optical density values. All samples and standards were run against the solvent (ethyl acetate) as a reference and then the average blank was subtracted from average retinoic acid sample value to obtain the actual retinoic acid concentration in the tape. The amount of retinoic acid present was calculated as follows:

$$\mu g/cm^2 = \frac{\text{dilution volume}}{\text{area}} \times \frac{\text{Extract volume}}{\text{Aliquot volume}} \times g/ml \text{ (obtained from standard curve for found optical density)}$$

Actual retinoic acid ($\mu g/cm^2$) = retinoic acid values ($\mu g/cm^2$) − Blank value ($\mu g/cm^2$)

$\lambda$max (ethyl acetate) − 351 m$\mu$

Optical density = 0.5 units/3.7 g/ml $\epsilon 351$ (ethyl acetate) = 40,000 (Literature $\epsilon 351$ methanol = 45,000)

EXAMPLE 1

The following starting materials were reacted: 2150 parts of poly(oxypropylene) triol, equivalent weight 897; 1443 parts of poly(oxypropylene/oxyethylene) tetrol from 90/10 propylene oxide/ethylene oxide extension of ethylene diamine, equivalent weight 902 and 660 parts of tolylene diisoyanate (an 80/20 mixture by weight of the 2,4/2,6-isomers), thus providing an NCO/OH ratio of 1.9:1. The resulting NCO/polyol reaction provided an NCO-terminated prepolymer. This prepolymer was then reacted with 206.5 parts of diethylethanolamine diluted with an equal amount (by weight) of toluene. The amount of diethylethanolamine used in this second step of the preparation was 100 percent of the moles of mono ol needed to cap the isocyanate-terminated pendent chains. The resulting prepolymer having pendent chains end-capped with diethylethanolamine, and still hot from the end capping reaction, was added with vigorous agitation to a solution of 10.5 parts of acetic acid in 7700 parts of water. The resulting emulsion was stirred to remove entrapped carbon dioxide and left to stand for more than 24 hours to completely cure.

200g. (37.7 percent solids of the above pressuresensitive adhesive) of adhesive and 20 ml of N,N-dimethyl formamide/acetic acid (10 ml/1 ml) solutions containing 0.01 percent citric acid (0.0076 g) and $1 \times 10^{-5}$ percent vitamin E ($7.6 \times 10^{-6}$ g) were heated to about 60°C. for a few minutes, then blended on a roll mill for 16 hours at about 25°C. 20 ml of a N,N-dimethyl formamide/acetic acid (19 ml/1 ml) solution containing 0.01 percent retinoic acid (0.0076 g) was added to theaabove mixture, again heated to about 60°C. for a few minutes and mixed for 10 hours. The resulting medicated pressure-sensitive adhesive system containing the retinoic acid was coated onto a silicone release paper with a supported knife applicator in the dark and the liquid phase removed by air-drying for 16 hours. A film of ramdomly oriented rayon fibers was laminated onto the adhesive. The laminate was stored at room temperature in envelopes in a file cabinet. The adhesive was present in an amount of 15.7 grains/24 in.$^2$ (6.6 mg/cm$^2$) and retinoic acid was present in the adhesive layer at a concentration of about 0.01 percent by weight (about 0.6$\mu$g/cm$^2$).

The tape was tested for stability at various times as noted in the table below.

| Retinoic Acid Present (in $\mu$g per cm$^2$) | | |
| --- | --- | --- |
| | 25°C | 60°C |
| Calculated Initially | 0.66 | — |
| found | 0.52 | — |
| After 1 week | — | 0.49 |
| After 2 weeks | — | 0.50 |
| After 3 weeks | — | 0.45 |
| After 4 weeks | 0.53 | 0.43 |

EXAMPLE 2

Following the procedure of Example 1, tapes A and B below were prepared and tested. The percentage of the various components is by weight of the pressure-sensitive adhesive layer on the tape after completion of all drying.

| Tape | Percent Retinoic Acid | Percent Vitamin E | Percent Citric Acid |
|---|---|---|---|
| A | 0.1 | $1 \times 10^{-4}$ | 0.1 |
| B | 0.005 | $5 \times 10^{-6}$ | 0.005 |

The tapes were tested using the procedure of Example 1 with the results shown in the table below.

| | Retinoic Acid Present (in $\mu$g per cm$^2$) | | | |
|---|---|---|---|---|
| | Tape A | | Tape B | |
| | 25°C | 60°C | 25°C | 60°C |
| Calculated | 6.5 | — | 0.33 | — |
| Initially found | 6.5 | — | 0.24 | — |
| After 1 week | — | 6.2 | — | 0.23 |
| After 2 weeks | — | 5.9 | — | 0.25 |
| After 3 weeks | — | 5.7 | — | 0.20 |
| After 4 weeks | 6.6 | 5.7 | 0.24 | 0.20 |

EXAMPLE 3

An isooctyl acrylate/acrylic acid copolymer in the ratio of 95/5 acrylate to acrylic acid was prepared according to Ulrich, U.S. Pat. No. Re. 24,906. The copolymer was dispersed in a mixture of heptane and isopropanol (70/30 by volume).

114 g (25.5 percent solids of the above pressure-sensitive adhesive of adhesive and 11.4 ml of a N,N-dimethyl formamide containing 1.0 percent retinoic acid (0.3 g), 0.55 percent vitamin E (0.16 g), 0.1 percent butylated hydroxytoluene (0.03 g) and 0.2 percent methyl-p-hydroxybenzoate (0.06 g) were mixed for 20 hours at about 25°C. The resulting medicated pressure-sensitive adhesive system containing the drug was coated onto a silicone release paper with a supported knife applicator in the dark and the liquid phase removed by air-drying for 16 hours. A film of randomly oriented rayon fibers was laminated onto the adhesive. The laminate was stored at room temperature in envelopes in a file cabinet. The adhesive was present in an amount of 11.9 grains/24 in.$^2$ (4.9 mg/cm$^2$) and retinoic acid was present in the adhesive layer at a concentration of about 1.0 percent by weight (about 49.7$\mu$g./cm$^2$). Stablizing of the tape was determined using the procedure described above except that methanol/water was used as the extracting agent. Results are shown in the table below.

| | Retinoic Acid Present ($\mu$g/cm$^2$) | |
|---|---|---|
| | 25°C | 60°C |
| Calculated | 49.7 | 49.7 |
| Initially found | 44.7 | 44.7 |
| After 1 week | — | 37.8 |
| After 2 weeks | — | 36.8 |
| After 3 weeks | — | 35.3 |
| After 4 weeks | 37.8 | 33.8 |

EXAMPLE 4

80.7 g (37.1 percent solids of the pressure-sensitive adhesive of Example 1) of adhesive and 15.0 ml of a N,N-dimethyl formamide solution containing 1 percent retinoic acid (0.3 g), 0.55 percent vitamin E (0.16 g), 0.1 percent butylated hydroxytoluene (0.03 g) and 0.2 percent methyl-p-hydroxybenzoate (0.06 g) were mixed for 1 hour at about 25°C. Acetic acid (5.0 ml) was then added and the formulation mixed for 16 hours at about 25°C. The resulting medicated pressure-sensitive adhesive system containing the drug was coated onto a silicone release paper with a supported knife applicator in the dark and the liquid phase removed by airdrying for 16 hours. A film of randomly oriented rayon fibers was laminated onto the adhesive. The laminate was stored at room temperature in envelopes in a file cabinet. The adhesive was present in an amount of 11.2 grains/24 in.$^2$ (4.7 mg/cm$^2$) and retinoic acid was present in the adhesive layer at a concentration of about 1.0 percent by weight (about 47.0$\mu$g/cm$^2$). Stabilixynof the tape was determined using the procedure described above except that methanol/water was used as the extracting agent. Results are shown in the table below.

| | Retinoic Acid Present($\mu$g/cm$^2$) | |
|---|---|---|
| | 25°C | 60°C |
| Calculated | 47.0 | 47.0 |
| Initially found | 46.5 | 46.5 |
| After 1 week | — | 46.5 |
| After 2 weeks | — | 44.7 |
| After 3 weeks | — | 43.7 |
| After 4 weeks | 46.5 | 41.3 |

EXAMPLE 5

Retinoic acid tapes were prepared following the procedure set forth for Tape A of Example 2 with nonwoven rayon backings and also with polyethylene backings. The in vivo release of the retinoic acid from these tapes was determined on rabbit skin. This was accomplished by determining the concentration of drug remaining in the tape after application to skin using the previously described procedure. The difference between these values and the initial concentration of the drug in tape indicates the amount of drug released by the tape system to the skin and, therefore, available to exert a pharmaceutical effect. The rabbit studies were conducted following the standard rabbit Draize protocol for primary skin irritation which is conducted on abrade and non-abraded skin [Draize, et al., J. Pharmacol, Exp. Therap., 82,377 (1944)]. The table below gives the percent retinoic acid released and primary skin irritation index.

| Backing | Percent Retinoic Acid Released Abraded (24 hours) | Percent Retinoic Acid Released Non-Abraded (24 hours) | Primary Skin Irritation Index |
| --- | --- | --- | --- |
| Occlusive Polyethylene | 59 | 25 | 0.54/8.00 |
| Non-Occlusive Rayon | 15 | 1 | 0.25/8.00 |

I claim:

1. A pressure-sensitive adhesive tape defining a means for applying a dermatological substance comprising a backing member with a layer of pressure-sensitive adhesive attached thereto, and a pharmacentically effective and stable concentration of retinoic acid and retinoic acid stabilizer homogeneously contained in said pressure-sensitive adhesive layer, said adhesive being dermatologically compatable and being compatable and substantially non-reactive to said retinoic acid and retinoic acid stabilizer.

2. The pressure-sensitive adhesive tape of claim 1 wherein said pressure-sensitive adhesive comprises an inherently rubbery and normally tacky polymer which is compatible and substantially non-reactive with retinoic acid at temperatures up to 60°C. and has a 100 percent modulus of less than 7 kg/cm$^2$ and wherein said pressure-sensitive adhesive layer contains 0.001 to 5 percent by weight retinoic acid homogeneously distributed therein.

3. The tape of claim 2 wherein said stabilizer is selected from the group consisting of vitamin E, citric acid, butylated hydroxyanisole, butylated hydroxytoluene and mixtures thereof.

4. The tape of claim 3 wherein said stabilizer is a mixture of vitamin E and citric acid.

5. The tape of claim 2 wherein said inherently rubbery and normally tacky polymer comprises a polyurethane having at least 20 percent pendant chains and 100 percent modulus of less than 5 kg/cm$^2$.

6. The tape of claim 4 wherein said inherently rubbery and normally tacky polymer comprises a polyurethane having at least 20 percent pendant chains and 100 percent modulus of less than 5 kg/cm$^2$.

7. The tape of claim 2 wherein said backing is porous.

8. The tape of claim 2 wherein said pressure-sensitive adhesive layer contains 0.025 to 0.5 percent by weight retinoic acid.

* * * * *